Nov. 16, 1926. 1,607,556
R. L. NEUBERT
RAILWAY CAR BRAKE
Filed March 26, 1926  2 Sheets-Sheet 1
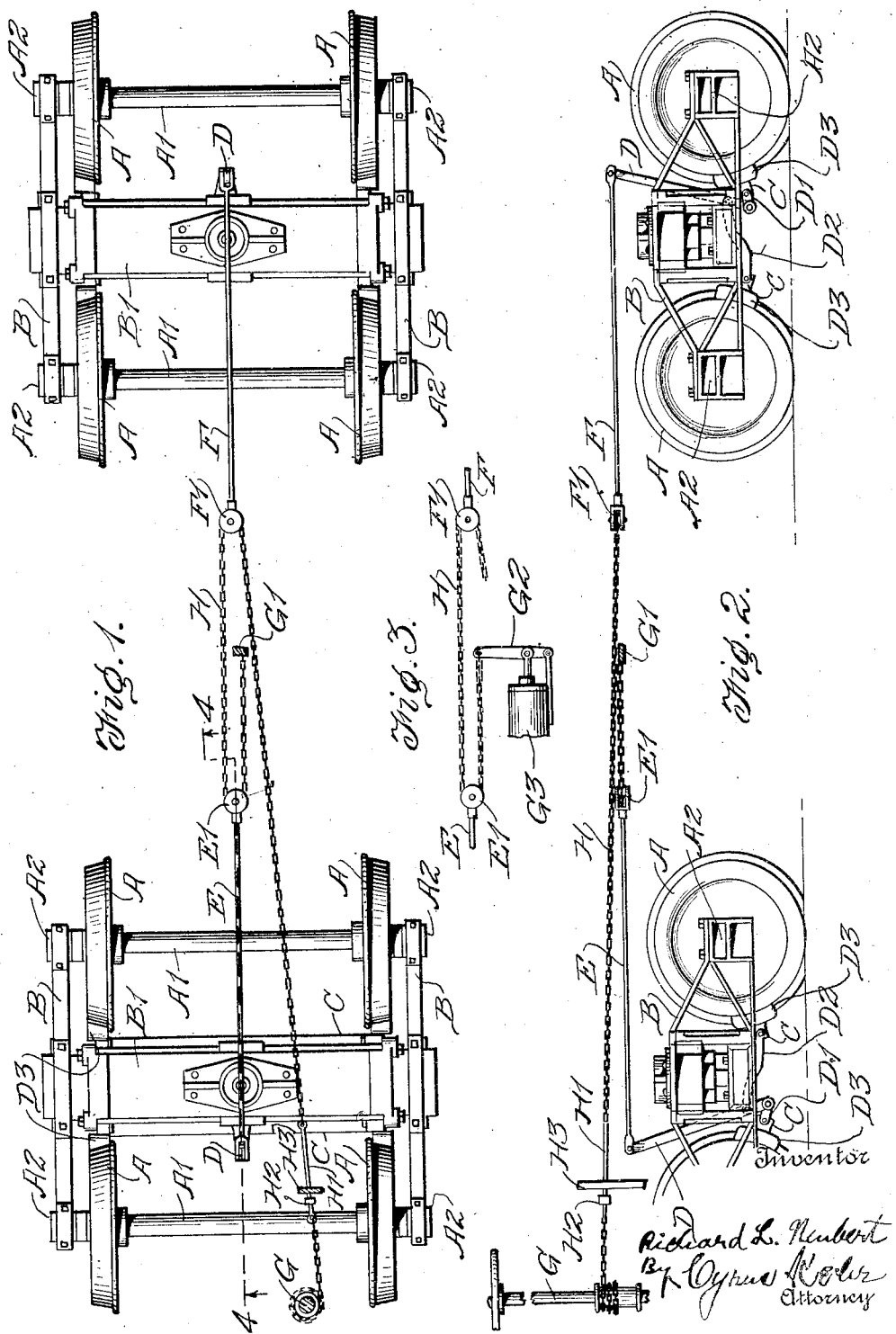

Nov. 16, 1926. 1,607,556
R. L. NEUBERT
RAILWAY CAR BRAKE
Filed March 26, 1926 2 Sheets-Sheet 2
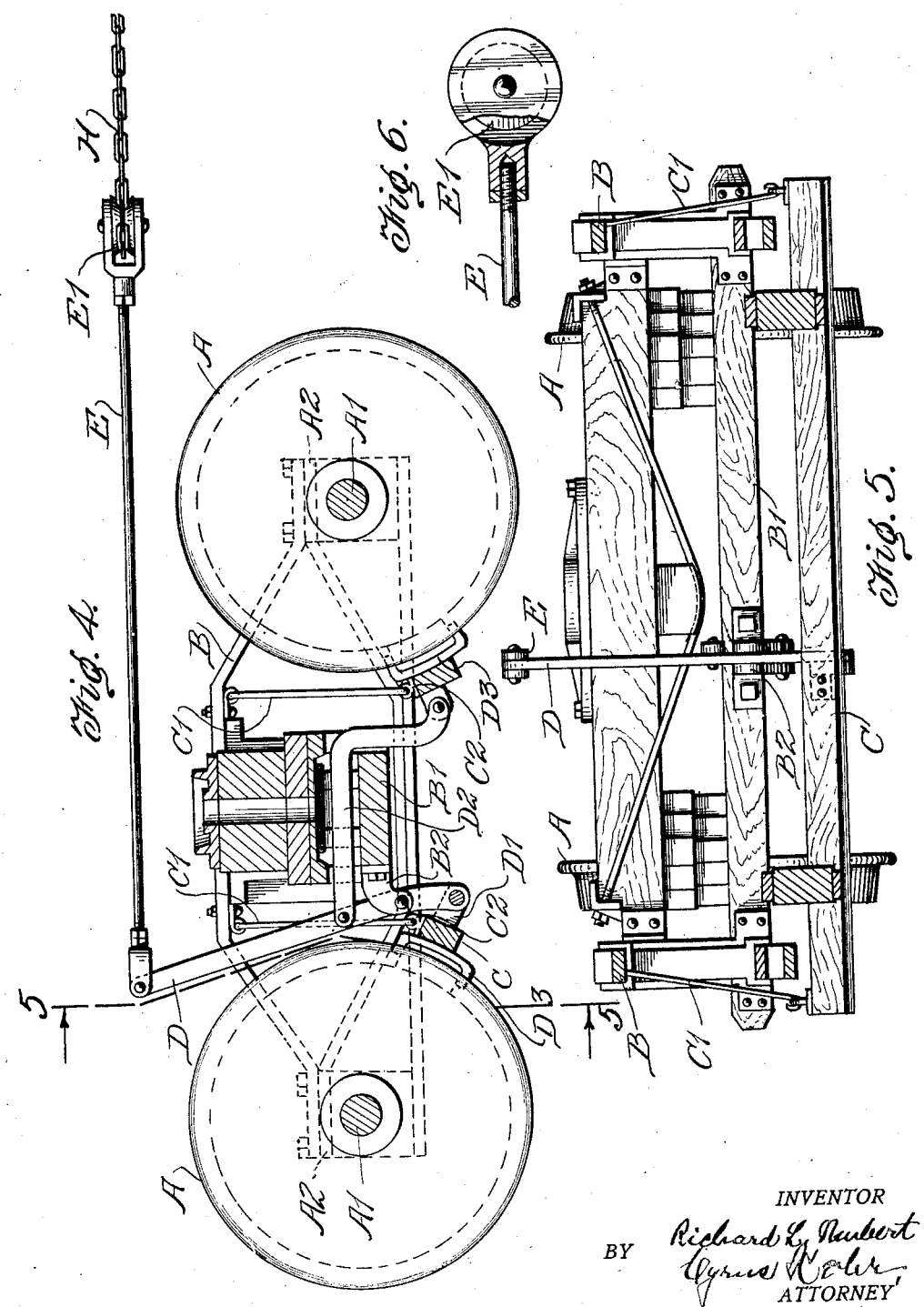
INVENTOR
Richard L. Neubert
BY
ATTORNEY Patented Nov. 16, 1926.

1,607,556

UNITED STATES PATENT OFFICE.

RICHARD L. NEUBERT, OF LAFOLLETTE, TENNESSEE.

RAILWAY-CAR BRAKE.

Application filed March 26, 1926. Serial No. 97,681.

This invention relates particularly to brakes for passenger and freight cars. I have applied this mechanism to cars for hauling logs and lumber, such cars having two sets of trucks and each truck having two axles and four wheels.

The object of the invention is to provide such a mechanism adapted to apply power equally to the wheels of both trucks, power being transmitted from a single source.

In the accompanying drawings,

Fig. 1 is a plan showing the two trucks of a car with my brake mechanism applied thereto;

Fig. 2 is a side elevation of the structure shown in Fig. 1, parts being omitted;

Fig. 3 shows detail modification;

Fig. 4 is a longitudinal upright section on the line, 4—4, of Fig. 1;

Fig. 5 is a section on the line, 5—5, of Fig. 4, looking toward the right;

Fig. 6 is a detail view of one of the pulleys.

Referring first to the left-hand truck shown in Figs. 1, 2 and 4 of the drawings, A, A are ordinary truck wheels adapted to rest on track rails. $A^1$, $A^1$ are axles supported by the wheels and resting in axle boxes, $A^2$. B, B are end frames supported by the axle boxes. $B^1$ is a platform placed between and parallel to the truck axles and having its ends supported by the end frames, B. Adjacent each pair of wheels is an ordinary brake beam, C, which is supported near each end by two hanger links, $C^1$, having their lower ends suitably coupled to eyes, $C^2$, on the beam and having their upper ends coupled to eyes, $C^3$, supported on the end frames, B.

A bracket, $B^2$, is supported on the platform above the brake beam and approximately midway between the ends of the platform. An upright lever, D, is coupled to said bracket near the lower end of the lever. The lower end of said lever is coupled to a bracket, $D^1$, seated on the adjacent part of the brake beam.

Above the bracket, $B^2$, the left-hand end of a horizontal link, $D^2$, is coupled to the lever, D, while the other end of said link is coupled to a bracket, $D^1$, on the companion brake beam, C. At each wheel a brake shoe, $D^3$, of suitable form is applied to the brake beam in position to engage the wheel when the beam is moved toward the wheels.

It will now be observed that if the upper end of the lever, D, as shown in Fig. 4, is moved toward the right, the adjacent bracket, $D^1$, and the adjacent beam and the shoe supported by that beam will be pressed toward the left and against the adjacent wheels, while the link, $D^2$, and the companion brake beam and the shoe supported by that beam will be pressed toward the right and against the wheels adjacent that beam.

The mechanism thus far described is the same on each of the two trucks of the car, excepting that the arrangement of the lever, D, and its connections are reversed in the two trucks. On each truck the lever, D, is placed at the side of the platform, $B^1$, which is toward the adjacent end of the car, so that for setting the brakes the upper end of the lever, D, is to be drawn toward the other truck.

Furthermore, the mechanism thus far described is of a form heretofore used. My improvement relates to means for sumultaneously drawing the upper ends of the levers, D, toward each other by power from a single source.

The drawings show a horizontal reach rod, E, extending rightward from and having its left hand end coupled to the upper end of the lever, D, and supporting on its right hand end a grooved pulley, $E^1$. A similar horizontal reach rod, F, extends leftward from and has its right hand end coupled to the upper end of the lever, D, of the other truck and has on its left hand end a grooved pulley, $F^1$. An upright winding post, G, is mounted on the left hand end of the car in the usual manner. Between the pulleys, $E^1$ and $F^1$, is a stationary post or block, $G^1$, which may be seated immovably in any convenient manner on the body of the car.

As shown in Fig. 1, a chain or cable, H, has one end secured to the block, $G^1$, and extends thence around the pulley, $E^1$, and thence around the pulley, $F^1$, and thence to the winding post, G.

When the winding post, G, is turned for winding the chain on said post, the chain traverses the pulley, $F^1$, and the pulley, $E^1$, and draws said pulleys toward each other with equal force, whereby the upper ends of the levers, D, are drawn toward each other with equal force, whereby the brakes are applied with the same force on one truck as on the other. When the winding post, G, is released, excessive reverse of the chain on the pulleys, F¹ and E¹, should be avoided. Provision for that is made by inserting into the chain, near the winding post, a long link H¹, on which is a fixed block, H². At the side of said block toward the pulleys is a stationary stop, H³, supported on the car body and adapted to engage the block, H², when the chain is made slack by the release of the winding post. Such engagement between the block, H², and the stop, H³, prevents further movement of this part of the chain toward the pulleys.

In Fig. 3, the lever, G², of an air or steam or other fluid cylinder, G³, is substituted for the block, G¹. When this mechanism is actuated to move the lever, G², toward the right, the chain, H, will be drawn to move the pulleys, E¹ and F¹, toward each other.

It is to be understood that the term, "chain", used herein is to apply to a chain or rope used separately or in connection with rods or longer links adapted to be used for engaging the pulleys and drawing them toward each other. Furthermore, the winding post, G, and the post or block, G¹, constitute terminal members to which the ends or terminals of the chain are secured. The winding post is a movable terminal. So is also the lever G², which is actuated by the cylinder, G³. If both this lever and the winding post are present, either may be actuated for drawing the chain to move the pulleys for moving the brake beams for braking.

I claim as my invention:

1. In an apparatus of the kind described, the combination of two trucks, a brake beam supported on each truck, brake shoes supported by each beam and adapted to engage the adjacent truck wheels, a lever coupled to the truck and the brake beam in position to have its free end moved toward the other truck for moving the brake beam toward said wheels, two pulleys located between the free ends of said levers, means joining the free end of each of said levers to the adjacent pulley, two terminal members supported by the car body, one being movable, a chain extending from one terminal member to and around one of the pulleys and thence to and around the other of said pulleys and thence to the other terminal member, substantially as described.

2. In an apparatus of the kind described, the combination of two trucks, a brake beam supported on each truck, brake shoes supported by each beam and adapted to engage the adjacent truck wheels, a lever coupled to the truck and the brake beam in position to have its free end moved toward the other truck for moving the brake beam toward said wheels, two pulleys located between the free ends of said levers, means joining the free end of each of said levers to the adjacent pulley, two terminal members supported by the car body one being movable, a chain extending from one terminal member to and around one of the pulleys and thence to and around the other of said pulleys and thence to the other terminal member, and means for limiting the reverse movement of the chain, substantially as described.

3. In an apparatus of the kind described, the combination of two trucks each having four wheels, two brake beams supported on each truck, brake shoes supported by each beam and adapted to engage the adjacent truck wheels, a lever coupled to the truck and the brake beams in position to have its free end moved toward the other truck for moving the brake beams toward said wheels, two pulleys located between the free ends of said levers, means joining said ends of said lever to the adjacent pulley, two terminal members supported by the car body, one being movable, a chain extending from one terminal member to and around one of the pulleys and thence to and around the other of said pulleys and thence to the other terminal member, substantially as described.

4. In an apparatus of the kind described, the combination of two trucks, a brake beam supported on each truck, brake shoes supported by each beam and adapted to engage the adjacent truck wheels, a lever coupled to the truck and the brake beam in position to have its free end moved toward the other truck for moving the brake beam toward said wheels, means intervening said levers and adapted to be actuated for with equal force drawing said levers toward each other, and means for applying power to said intervening means, substantially as described.

5. In an apparatus of the kind described, the combination of two trucks, a brake beam supported on each truck, brake shoes supported by each beam and adapted to engage the adjacent truck wheels, a lever coupled to the truck and the brake beam in position to have its free end moved toward the other truck for moving the brake beam toward said wheels, means intervening said levers and adapted to be actauted for with equal force drawing said levers toward each other, and a winding member in operative relation with said intervening means to apply power to said intervening means, substantially as described.

In testimony whereof I have signed my name, this 20th day of March, in the year one thousand nine hundred and twenty-six.

RICHARD L. NEUBERT.